Jan. 13, 1970 T. KOLOBOW 3,489,647
ARTIFICIAL ORGAN FOR MEMBRANE DIALYSIS OF BIOLOGICAL FLUIDS
Filed May 6, 1964 2 Sheets-Sheet 1

INVENTOR.
THEODOR KOLOBOW
BY
Jack E. Marmour
AGENT

Jan. 13, 1970          T. KOLOBOW          3,489,647
ARTIFICIAL ORGAN FOR MEMBRANE DIALYSIS OF BIOLOGICAL FLUIDS
Filed May 6, 1964          2 Sheets-Sheet 2

INVENTOR.
THEODOR KOLOBOW
BY

*Jack E. Mosmond*

AGENT

United States Patent Office 3,489,647
Patented Jan. 13, 1970

3,489,647
ARTIFICIAL ORGAN FOR MEMBRANE DIALYSIS OF BIOLOGICAL FLUIDS
Theodor Kolobow, Rockville, Md., assignor to Dow Corning Corporation, Midland, Mich., a corporation of Michigan
Filed May 6, 1964, Ser. No. 365,262
Int. Cl. C12k *1/10;* A61m *5/00;* A61k *17/00*
U.S. Cl. 195—1.8                                    9 Claims

ABSTRACT OF THE DISCLOSURE

An artificial organ for the membrane dialysis of biological fluids is disclosed. A process for the dialysis of biological fluids is also disclosed wherein negative pressure on the dialyzate is employed. The article and process are particularly useful in supporting or supplanting the lung or kidney.

---

Figure 1:
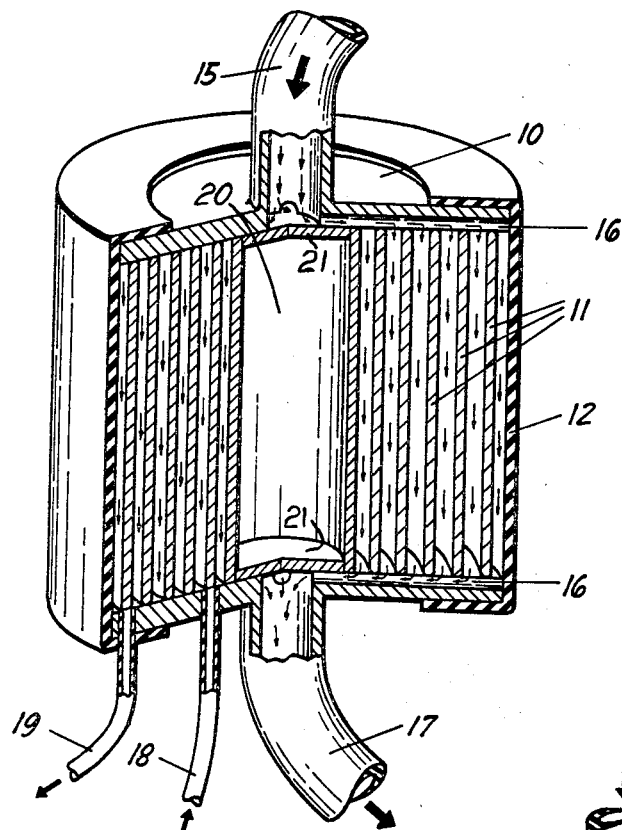

This invention relates to an artificial organ which is useful in supporting or supplanting the lung, kidney, placenta or any other organ in which membrane dialysis of a fluid is carried out to remove normal or abnormal metabolites and/or gases, which may be present in unphysiologic quantities, from the fluid or to otherwise alter that fluid. The organ of this invention is also useful, for example, in cases of endocrine, renal or hepatic dysfunction or in cases of ingestion of toxic materials. The organ of this invention is also useful for adding to or removing form a body fluid a biologically active material such as, for example, a toxicant, metabolite, nutrient or a medicament.

Much research has been done in the development of artificial organs and, in particular, artificial lungs to be used in the oxygenation of blood during surgery. The earliest of these artificial lungs employed a blood-oxygen interface, that is, oxygen was bubbled through the blood, or brought directly in contact with a film of the blood in some manner. Such devices had disadvantages such as danger of gas or particulate embolization and protein denaturization. These blood oxygenators have generally been replaced by membrane oxygenators. The newer oxygenators utilize the principle of gas diffusion through a membrane. In membrane oxygenators the exchange of oxygen and carbon dioxide occurs under conditions very similar to those existing in the lungs. Membrane oxygenators overcome some of the problems of the earlier oxygenators by elimination of the gas-blood interface. Thus, there is little or no protein denaturization by the gases, reduced danger of gas emboli and they hold a relatively constant volume of blood without any regulating devices. The oxygenators currently available, however, still have disadvantages. For example, they require large volumes of blood to prime them, they tend to be extremely large and bulky, and most importantly, the oxygenation rate leaves much to be desired. In all of the more recent oxygenators, the oxygen employed has been under atmospheric or super-atmospheric pressure; therefore, should a leak occur the danger of gas embolization, protein denaturization and the other disadvantages of the earlier oxygenators again exist.

It is an object of this invention to provide an artificial organ or dialyzing unit, such as a lung or kidney, which overcomes the disadvantages of the prior art devices. More specifically, it is an object of this invention to provide an artificial membrane lung or kidney which is relatively small in size when compared to currently available devices, which requires only a small quantity of blood to prime it, which provides better oxygenation or dialysis of the blood and which eliminates the danger of gas or other embolic phenomena even if a leak should occur. Another object of this invention is to provide for the hypobaric oxygenation of blood. It is still another object to provide for the hypobaric dialysis of blood. It is a further object to provide an improvement in a process of oxygenating blood with a membrane-lung which comprises maintaining the oxygen under negative or reduced pressure. It is still a further object to provide an improvement in a process of dialyzing blood with a membrane-kidney which comprises maintaining the dialyzate under negative or reduced pressure.

Another object is to provide an artifical organ comprising (1) at least one envelope each of which includes a spacer sandwiched between a pair of membranes, and which has at least one fluid inlet and at least one fluid outlet, (2) a support for the envelopes which includes means for blood to enter the organ, be distributed over the membranes of the envelopes, and leave the organ and (3) a jacket which consolidates the envelopes and support.

Other objects and advantages of this invention will be apparent from the following description and the claims.

Figure 2:
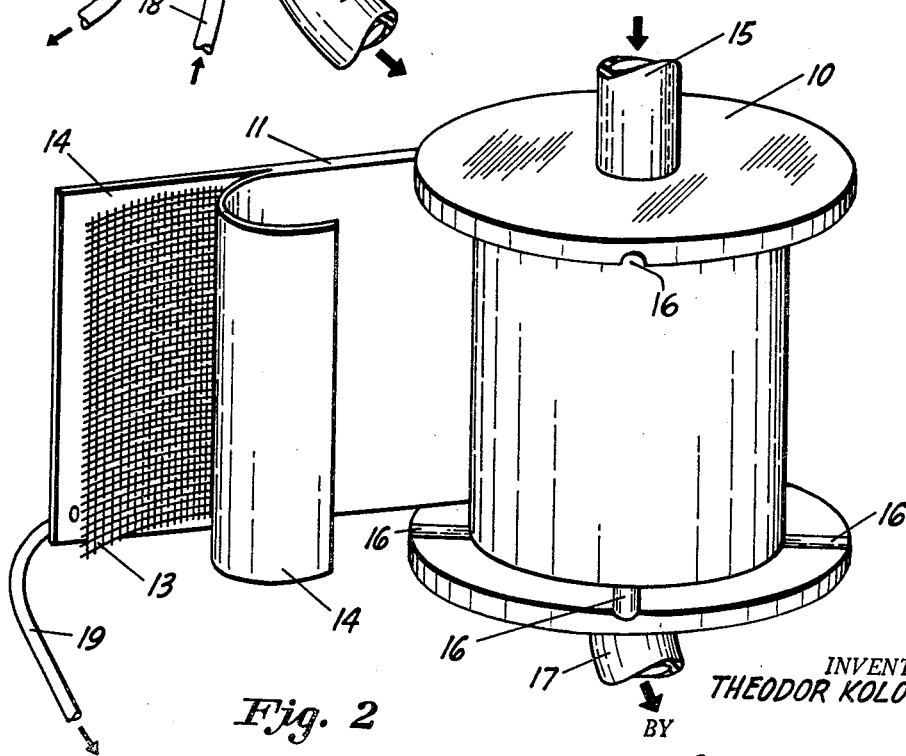
Figure 3:
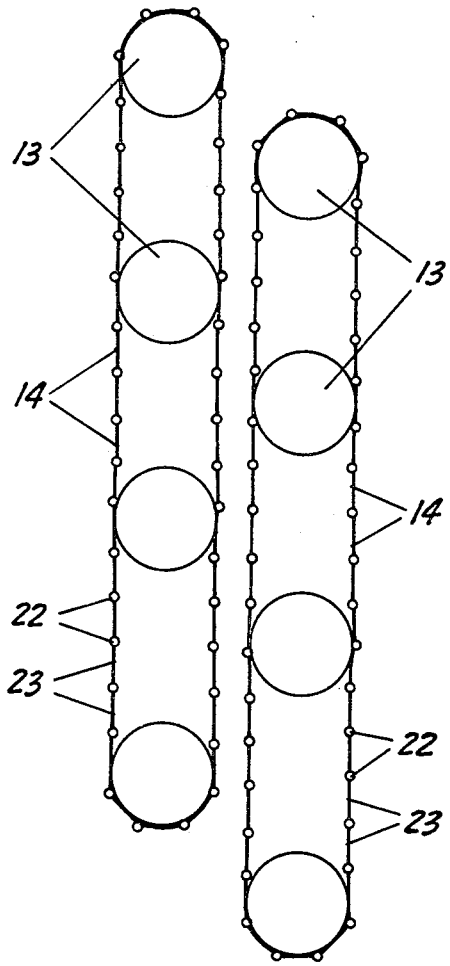
Figure 4:
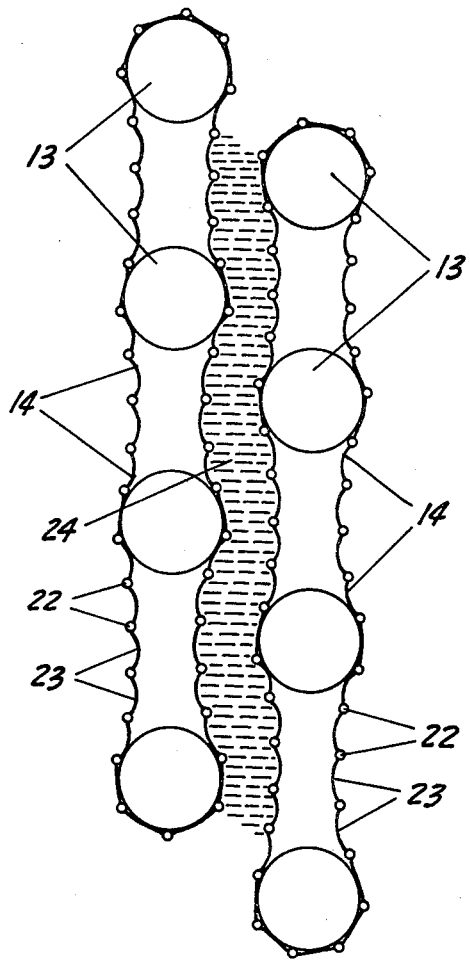

Referring now to the drawings, FIGURE 1 is a cut-away view showing the preferred embodiment of the apparatus of this invention when used as an artificial membrane lung. FIGURE 2 shows parts of the apparatus of FIGURE 1 in more detail. FIGURES 3 and 4 show enlarged cross sections of the envelope 11 employed in the apparatus of FIGURE 1.

More specifically, FIGURE 1 shows an artificial membrane lung composed of a central core, spool, or spindle 10 made of a suitable material such as Lucite, which is a clear acrylic resin plastic. Core 10 serves as a support for envelope 11. Obviously, core 10 can be made of metal, silicone rubber or any other suitable material. Needless to say, all materials employed in the construction of the apparatus must be inert with respect to the blood or other fluid, sterilize adequately, and be of medical quality. In the embodiment shown in the drawing, core 10 contains a chamber 20 in the center. An artificial vacuum activated heart (not shown) can be placed in chamber 20 to convert the apparatus of this invention to a heart-lung machine. Such a combination of heart and lung is illustrated on page 1 of the "Bulletin of the Dow Corning Center For Aid to Medical Research," vol. 6, No. 1, January 1964. Of course, core 10 need not have chamber 20 but can have a solid center instead. When no artificial heart is used in conjunction with the lung, plugs 21 made of the same or different material as core 10 are used to seal off chamber 20 and thus prevent the flow of blood into the chamber. Core 10 contains grooves or channels 16, in each end, which aid in the distribution of the blood over the envelope 11 after the blood enters the lung and aid in channeling the blood back to the outlet for return to the body after it passes or circulates through the oxygenerator. Grooves 16 are best seen in FIGURE 2. Any number of grooves 16 can be employed, for example, 4, 5, 6, 8 or more.

As shown in FIGURES 1 and 2, an envelope 11 is wound around core 10. The use of an envelope about 12 centimeters wide and about 8.25 meters long, which gives an oxygenating surface area of about 2 square meters, has been found to be satisfactory. Such an envelope can be wound about 20 times around the core. Envelope 11 is composed of a spacer 13 sandwiched between a pair of membranes 14. At least one oxygen inlet 18 and one excess oxygen and carbon dioxide outlet 19 is sealed into the envelope 11. Spacer 13 can be composed of any suitable material which will maintain the desired spacing between membranes 14 and still permit proper flow of the fluid through the envelope. Examples of particularly useful materials for the spacer are metal, fiberglass, Teflon, polyethylene, cellulose, Saran and silicon rubber. Most preferably, the spacer is in the form of a screen. The preferred material for use at this time as a spacer, when the apparatus is used as a lung, is a 15 to 25 mil thick vinyl coated fiberglass screen.

Membrane 14 can be any membrane which is fluid permeable. Examples of suitable membrane materials include silicone rubber, cellophane, regenerated cellulose, polyethylene and latex. The membrane can be made of these materials per se, i.e. be unsupported, or the membrane can contain a support. Most preferably, for the lung, membrane 14 is made of a nylon or Dacron screen which has been dip coated with silicone rubber. Such a material is commercially available. The membrane can be of either an extensible or non-extensible material. When the the apparatus is used in the preferred method of this invention, that is, with oscillating negative pressure, membrane 14 is preferably an extensible membrane. The inlets 18 and outlet 19 can be made of any suitable material such as silicone rubber tubing.

In the preferred embodiment of this invention, as shown in FIGURES 1 and 2, envelope 11 is wound around core 10. The winding is done in such a manner so as to keep the surface of envelope 11 essentially wrinkle free. This is to prevent channeling of the blood as it passes between the turns of the envelope. While winding of the envelope 11 is done fairly snugly, it must not be wound so tightly that the passage of the blood between the various turns is prevented. The thinner the film of blood passing between the turns of the envelope, the better the oxygenation rate will be. Any number of turns of envelope 11 can be employed so long as there is more than one turn. In the light of what is known at this time, 20 to 40 turns is preferred. Once envelope 11 is in place on core 10, a jacket 12 made of a suitable material such as silicone rubber is placed on the core 10 so as to consolidate envelope 11 and the support, sealing in the envelope.

In operation, venous (unoxygenated) blood is carried from the patient via suitable means such as a silicone rubber tube 15 to the artificial membrane lung. As the venous blood enters the lung, it is distributed by means of grooves 16, over envelope 11 wound around core 10. From there the blood passes downward over the outer surfaces of envelope 11 and between the layers of the envelope 11 until the blood reaches the bottom of the lung where it is then channeled back to an outlet by means of other grooves 16 and returned to the patient, oxygenated, via a suitable means such as a silicone rubber tube 17.

The oxygenation of the blood is accomplished in the lung as follows. As the blood is passed downward over the surfaces and between the layers of envelope 11, oxygen is being drawn into and through envelope 11 via tube 18 by applying suction (i.e. a negative pressure), either constant or oscillating, on tube 19. As oxygen passes through envelope 11 it also diffuses through membrane 14 of the envelope entering and thereby oxygenating the blood. At the same time carbon dioxide diffuses from the blood through membrane 14 into envelope 11 and passes from the envelope via tube 19 along with the excess oxygen. The blood can be passed through the lung either by gravity flow, or by means of a suitable pump, such as a Sigmamotor or DeBakey pump.

As stated above, membrane 14 is preferably an extensible membrane. FIGURES 3 and 4 show a pair of adjacent turns of envelope 11. FIGURE 3 shows envelope 11 having an extensible membrane 14 without negative pressure or suction being applied to tube 19 while FIGURE 4 shows the same thing except with a negative pressure being applied. FIGURE 4 shows that the application of the negative pressure causes the extensible membrane to stretch and become thinner, thereby actually increasing the diffusion rate of the oxygen through the membrane, rather than decreasing it, as one might expect from the use of a negative pressure. Preferably, an oscillating negative pressure is employed, since this causes a flexing of membrane 14 which in turn causes agitation of the blood between the turns of the envelope, and further aids in the oxygenation. As oscillating negative pressure with its agitating effect is extremely advantageous when no blood is being passed through the lung, because it keeps the blood in motion, thus preventing clot formation and the other problems which arise when blood is allowed to stagnate. In FIGURES 3 and 4, one can more clearly see that membrane 14 is made up of a Dacron screen 22 which has been dip coated with silicone rubber 23. FIGURE 4 also shows how blood 24 passes between the turns of envelope 11.

A lung having about 20 turns and of the size illustrated above requires approximately 100 cc. of blood to prime it. This is an extremely small amount of blood compared to prior art oxygenators, and makes it possible to use a patient's own blood to prime the lung. The advantage here is obvious and a feasible application is that of the patient having had coronary thrombosis or other cardiac conditions.

The width of envelope 11 should preferably be as small as practically possible, so that the distance that the blood flows over a membrane is very small. As is known by those skilled in the art, the shorter the flow distance of the blood, the less chance there is of damage to the blood components. Preferably, the width of envelope 11 should be in the range of from 5 to 15 centimeters. The flow rate of the blood through the lung will, of course, be determined by the operator and depend, among other considerations, upon the size of the patient.

An oxygenator of the size described above, which occupies a cylindrical space of about 12 by 12 centimeters, allows an uptake of about 200 cubic centimeters of oxygen per the 2 square meters of surface area per minute, with a comparable exchange of carbon dioxide, when an extensible membrane and oscillating negative pressure are employed. The agitation caused by the flexing membrane increases oxygenation by more than 50%. Also, by the use of a negative pressure in the apparatus of this invention, if a leak should occur in the membrane or the sealed edges thereof, blood will be sucked into the oxygen screen compartment, i.e. into envelope 11, where it will eventually stop either because of the high resistance encountered to the flow of liquids, or because of clotting. In no case, however, should there be any danger that gas will ever enter the blood stream and cause embolism.

The above device is equally effective when used as an artificial kidney. When used as such, it is preferable to employ a spacer of greater thickness than when the device is employed as a lung, say about 150 to 200 mils. The preferred spacer material for a kidney is a polyethylene screen and a preferred membrane material is cellophane. Of course, instead of oxygen being passed through envelope 11, a dialyzing fluid is employed instead. The blood is preferably passed through the kidney by gravity flow. The kidney of this invention approximately doubles the efficiency of currently available kidneys which have an efficiency of about 25 to 30%. When the device is used as a placenta, it will be similar to the kidney except for the specific fluid passed through the envelope. The fluids to be used in the kidney and placenta are well known in the art and hence are not described here.

While the artificial organs of this invention can be flat, square, rectangular or sinuous in shape, and of varied size and proportion of components, the cylindrical shape illustrated in the drawings is preferred at this time. Equivalent embodiments and materials other than those described above and within the scope and spirit of this invention will be obvious to those skilled in the art.

Extracorporeal partial and total veno-arterial and venovenous perfusions were performed on anesthetized dogs using the apparatus and process of this invention. Some of the experiments were performed on dogs with tracheal intubation and nitrogen or a mixture of nitrogen and air ventilation. In this way the dog's lungs were used as a deoxygenator so as to fully evaluate the gas transfer capabilities of the artificial lung of this invention.

The artificial lungs used in these experiments were of the type illustrated in the drawings. After assembly, each lung was tested for leaks by determining the rate of oxygen passing through the inlet tube. This test correlated excellently with the presence or absence of pinholes in the membranes after the experiment. Whenever small leaks were present, or developed during the course of the perfusion, they became entrapped inside the screen spacer and did not spread. These areas became manifest after the experiment as red flea bitten spots. Larger pinholes caused larger leaks which somewhat impaired oxygen flow through the envelope. However, in no case was leaking of oxygen into the blood apparent.

In the experiments the artificial lung was filled by gravity. Its priming volume remained constant to within 5% at all perfusion pressures used. The perfusion pressures vary according to the membrane used and is a function of the blood layer thickness between the turns of the envelope and the distance the blood has to travel.

The examples set forth below represent data obtained in the experiments described above employing various membranes and artificial lung setups. In all of the examples a vinyl coated fiberglass screen spacer was used.

EXAMPLE 1

In this example a 5 mil thick silicone rubber membrane was used. The surface area of the envelope was 0.75 square meters. The lung was primed with 400 cc. of blood. Continuous suction was applied to the oxygen outlet tube. The oxygen uptake was 63 cc. per square meter of envelope surface area per minute.

EXAMPLE 2

In this example a Dacron screen dip coated with silicone rubber was used as the membrane. The surface area of the envelope was 0.8 square meters. The lung was primed with 400 cc. of blood. Continuous suction, 530 mm. of mercury, was applied to the oxygen outlet tube. The oxygen uptake was 100 cc. per square meter of envelope surface area per minute.

EXAMPLE 3

The membrane, envelope surface area and priming volume employed in this example were identical to that of Example 2. Intermittent or pulsing suction was applied to the oxygen outlet tube. A mean vacuum of 500 mm. of mercury was employed. The oxygen uptake was 150 cc. per square meter of envelope surface area per minute. The blood was 97% saturated.

EXAMPLE 4

The membrane employed in this example was identical to that of Examples 2 and 3. The surface area of the envelope was 1.2 square meters. The lung was primed with 110 cc. of blood. Intermittent suction (i.e. negative pressure) was applied to the oxygen outlet tube. A mean vacuum of 500 mm. of mercury was employed. The oxygen uptake was 82 cc. per square meter of envelope surface per minute. The blood was 100% saturated.

That which is claimed is:

1. In a process of oxygenating blood with a membrane-lung wherein the blood is passed over one side of the membrane at or above atmospheric pressure, the improvement comprising alternately applying a greater and lesser negative pressure to the oxygen on the other side of the membrane whereby an oscillating hylpobaric pressure is maintained.

2. A process of oxygenating blood which comprises passing blood at or above atmospheric pressure over the outside of an envelope while passing oxygen through said envelope by alternately applying a greater and lesser negative pressure to the oxygen whereby an oscillating hypobaric pressure is maintained thereon, whereby a portion of the oxygen diffuses through the envelope entering and thereby oxygenating the blood while at the same time carbon dioxide diffuses from the blood into the envelope and passes from the envelope along with the excess oxygen.

3. In a process of dialyzing with a membrane-kidney wherein the blood is passed over one side of the membrane at or above atmospheric pressure, the improvement comprising alternately applying a greater and lesser negative pressure to the dialyzate on the other side of the membrane whereby an oscillating hypobaric pressure is maintained.

4. In a process of adding to or removing from a body fluid a biologically active material by dialysis through a membrane wherein the body fluid is passed over one side of the membrane at or above atmospheric pressure, the improvement comprising alternately applying a greater and lesser negative pressure on the side of the membrane opposite the body fluid whereby an oscillating hypobaric pressure is maintained and whereby the biologically active material diffuses through the membrane.

5. The process of claim 4 wherein the body fluid is blood.

6. A process for adding or removing a biologically active material to or from a body fluid which comprises passing the body fluid at or above atmospheric pressure over the outside of an envelope while passing the dialyzate through said envelope by alternately applying a greater and lesser negative pressure to the dialyzate whereby an oscillating hypobaric pressure is maintained thereon, whereby the biologically active material diffuses through the envelope.

7. An artificial organ comprising a support, there being on said support one or more envelopes constructed of a spacer sandwiched between a pair of membranes, each envelope having a dialyzate inlet in one end and a dialyzate outlet in the other end whereby the dialyzate passes through the inside of the entire envelope, said support having means in one end for a body fluid to enter the organ and be distributed over the membranes, and said support having means in the other end for the body fluid to collect and leave the organ, there being a jacket which consolidates the envelope(s) and the support by forming with the support a sealed enclosure for the envelope(s).

8. An artificial lung comprising a spool, there being wound around said spool an envelope constructed of a fiberglass screen spacer sandwiched between a pair of membranes, said membranes being a fabric screen coated with silicone rubber, said envelope having a silicone rubber oxygen inlet tube in one end and a silicone rubber excess oxygen and carbon dioxide outlet in the other end whereby the oxygen passes through the inside of the entire envelope, said spool having means in one end for blood to enter the lung and be distributed over the membranes, and said spool having means in the other end for the blood to collect and leave the lung, there being a silicone rubber jacket which consolidates the envelope and spool by forming with the spool a sealed enclosure for the envelope.

9. An artificial kidney comprising a spool, there being wound around said spool an envelope constructed of a polyethylene screen spacer sandwiched between a pair of cellophane membranes, said envelope having a dialyzate inlet tube in one end and a dialyzate outlet tube in the other end whereby the dialyzate passes through the inside of the entire envelope, said spool having means in one end for blood to enter the kidney and be distributed over the membranes, and said spool having means in the other end for the blood to collect and leave the kidney, there being a silicone rubber jacket which consolidates the envelope and spool by forming with the spool a sealed enclosure for the envelope.

(References on following page)

References Cited

UNITED STATES PATENTS

| | | | |
|---|---|---|---|
| 3,212,498 | 10/1965 | McKirdy et al. | 23—258.5 |
| 3,212,642 | 10/1965 | Kylstra | 210—321 |
| 3,332,746 | 7/1967 | Claff et al. | 23—258.5 |
| 3,034,505 | 5/1962 | Sobel | 23—258.5 |
| 3,060,934 | 10/1962 | Claff et al. | 23—258.5 |

FOREIGN PATENTS

| | | |
|---|---|---|
| 1,064,199 | 8/1959 | Germany. |

OTHER REFERENCES

Kylstra et al., A Hemodialyzer-Ultrafilter Derived from an Oxygenator, from Trans. Amer. Soc. for Artif. Int. Organs, vol. VII, of meeting held Apr. 9–10, 1961, 391 pp. Pages 22–26 relied on.

Claff et al. A Pulsatile Pressure Transport Eng. Across Artificial Membranes.—Proc. of 16th Ann. Conf. on Eng. in Med. & Bro. Vol. 5. Entire article (4 pp.).

Bodell et al. A Capillary Membrane Oxygenator November 1963 (pp. 639–650).

JAMES H. TAYMAN, Jr., Primary Examiner.

U.S. Cl. X.R.

3—1; 23—258.5; 128—214; 210—22, 321; 425—101